Feb. 12, 1929.
D. CURRIE ET AL
1,702,200
CORN HARVESTING AND HUSKING MACHINE
Filed April 7, 1924     3 Sheets-Sheet 1
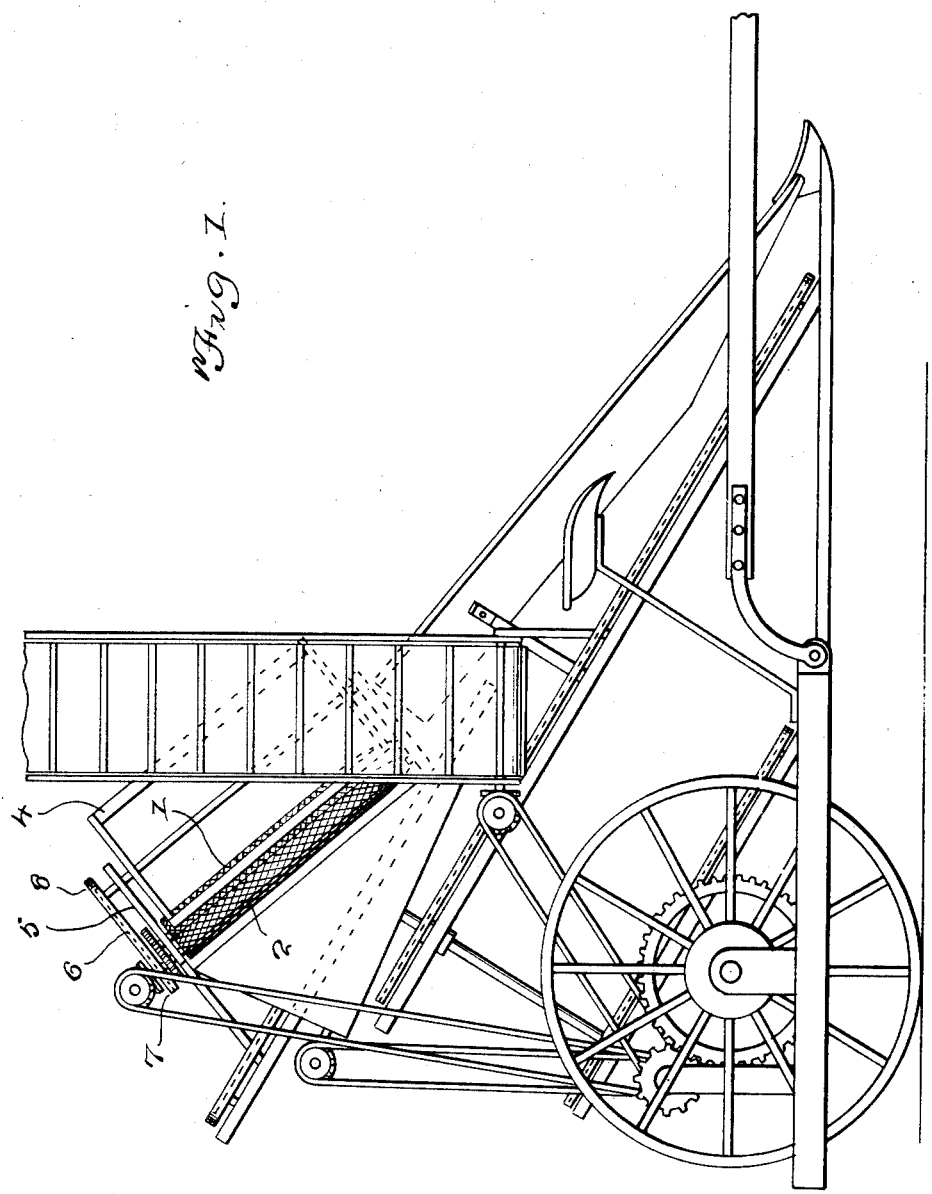
Dugald Currie
Donald Currie
INVENTOR
BY Victor J. Evans
ATTORNEY

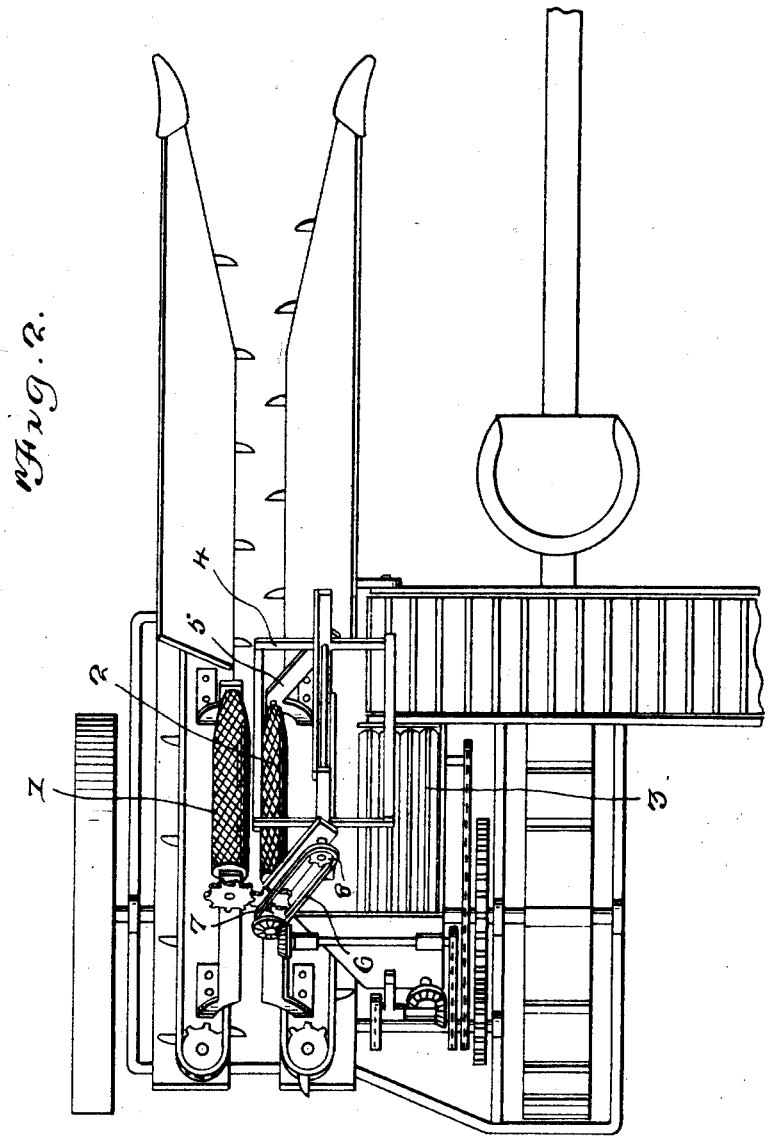

Feb. 12, 1929.　　　　　　　　　　　　　　　　　　　1,702,200
D. CURRIE ET AL
CORN HARVESTING AND HUSKING MACHINE
Filed April 7, 1924　　　3 Sheets-Sheet 3
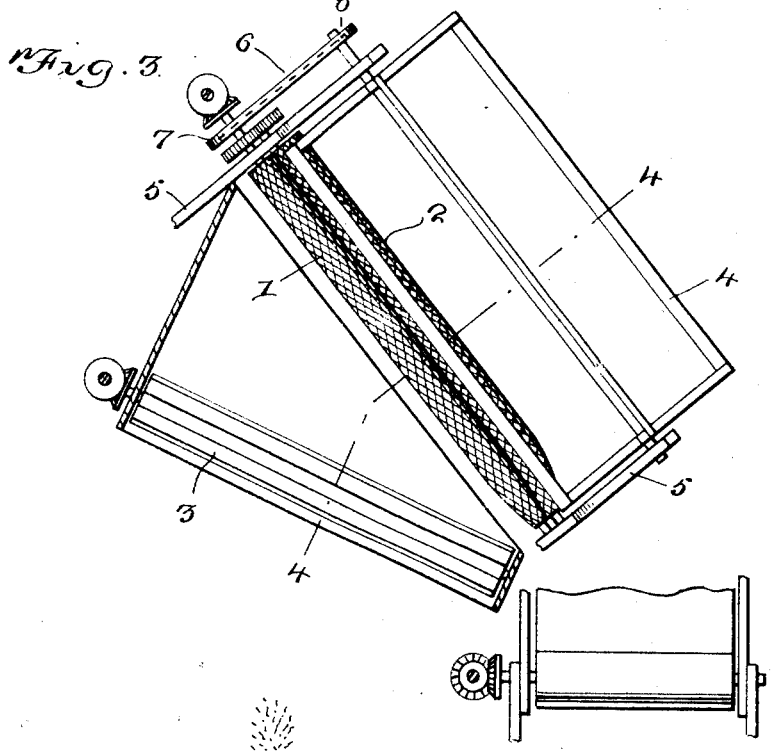
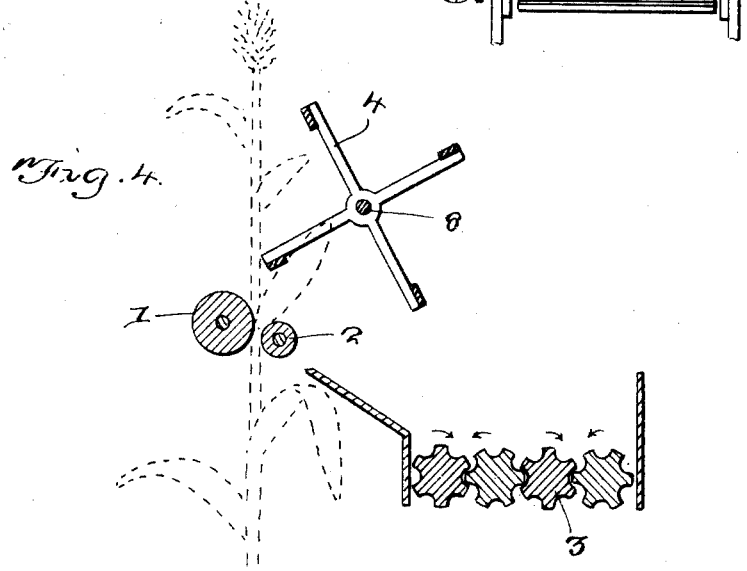

Patented Feb. 12, 1929.

1,702,200

UNITED STATES PATENT OFFICE.

DUGALD CURRIE AND DONALD CURRIE, OF ODEBOLT, IOWA.

CORN HARVESTING AND HUSKING MACHINE.

REISSUED

Application filed April 7, 1924. Serial No. 704,819.

This invention relates to improvements in corn harvesting machines, the general object of the invention being to provide means for moving the snapping means so that the ears will be snapped with but little effort and to permit the machine to be constructed of light weight and draft.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of a corn harvester showing my invention applied thereto.

Figure 2 is a plan view.

Figure 3 is a sectional detail view.

Figure 4 is a diagrammatic view showing the operation of the device.

As shown in these views, we make the snapping rollers 1 and 2 of different diameters with the small roller 2 closer to the husking mechanism 3 and slightly below the large roller so that the ear is slightly tilted towards the husking mechanism when engaged by the snapping rollers. We also provide a reel 4 for knocking the ears of corn off the stalk as they are tilted by the snapping rollers. Thus the snapping or picking mechanism can be made of light construction and will need but little power to operate it. This mechanism will pick the ears from the stalks practically the same as human labor would do it and the reel knocks the ear into the husking mechanism. This mechanism snaps the ears off the stalks instead of pinching the ears off the stalk as is now done.

The reel 4 is supported by the arms 5 forming a part of the frame and it is driven from the small snapping roller by the chain 6 which passes over the sprockets 7 on the snapping roller and on the shaft 8 of the reel.

The improvement can be placed on corn harvesters of any desired type, the drawings simply showing a conventional form of harvester. The snapping rollers have their forward ends tapered so that the stalks can easily pass between them.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

In a corn picking and harvesting machine, a catch arranged to engage the stalk of the corn, guides for conducting the stalks in an upright position, a rotating roller together with a smaller rotating roller engaging the stalk, whereby the said rollers are arranged in close relation, the axis of the larger being elevated slightly above the axis of the smaller to cause the stalks to bend in a predetermined position while passing between the said rollers, a revolving reel consisting in side members and cross bars on the ends of said side members, the said cross bars passing, when revolving, just above the rollers and behind an ear of corn in such a relation as to engage the ear of corn on the stalk near the juncture of the ear and stalk, and a husking means consisting in rotating toothed rollers.

In testimony whereof we affix our signatures.

DUGALD CURRIE.
DONALD CURRIE.